United States Patent [19]

Takata

[11] Patent Number: 5,292,184
[45] Date of Patent: Mar. 8, 1994

[54] WHEEL SPEED CORRECTION DEVICE WHICH COMPENSATES FOR CHANGES IN TIRE DIAMETER AND DURING VEHICLE TURNS

[75] Inventor: Koji Takata, Itami, Japan

[73] Assignee: Sumitomo Electric Industries, Ltd., Osaka, Japan

[21] Appl. No.: 848,686

[22] Filed: Mar. 9, 1992

[30] Foreign Application Priority Data

Mar. 12, 1991 [JP] Japan ................. 3-046774

[51] Int. Cl.$^5$ .......................................... B60T 8/24
[52] U.S. Cl. ................................. 303/100; 364/426.02
[58] Field of Search ................. 303/91, 100, 102, 103, 303/105, 106, 111; 364/426.02

[56] References Cited

U.S. PATENT DOCUMENTS

| | | | |
|---|---|---|---|
| 3,691,524 | 9/1972 | Frost et al. | 180/271 X |
| 4,545,623 | 10/1985 | Sato et al. | 303/92 |
| 5,060,747 | 10/1991 | Eto | 180/197 |
| 5,179,526 | 1/1993 | Zimmer et al. | 303/102 X |

FOREIGN PATENT DOCUMENTS 0387384 9/1990 European Pat. Off. .
4019886 2/1991 Fed. Rep. of Germany .
8904783 6/1989 World Int. Prop. O. .

*Primary Examiner*—Andres Kashnikow
*Assistant Examiner*—Josie A. Ballato
*Attorney, Agent, or Firm*—Sandler Greenblum & Bernstein

[57] ABSTRACT

A wheel speed correction device for use in a vehicle corrects for the change of the circumferential wheel speed caused by variations in the wheel tire diameter, differences in the paths of the left and right wheels when the vehicle turns, and/or abnormal slipping between the tire and the road surface. The wheel speed correction device has a device for measuring a wheel rotation angular speed of each wheel, a device for correcting a coefficient representing a tire diameter and producing a corrected coefficient for each wheel, a device for calculating, from the measured angular speed, a diameter-corrected wheel speed using the corrected coefficients, a device for obtaining a turning correction amount from a difference between diameter-corrected wheel speeds of the left and right wheels, and a device for correcting the diameter-corrected wheel speed using the turning correction amount.

15 Claims, 5 Drawing Sheets

$AV_1 - AV_4$: WHEEL ANGLE SPEED MEASUREMENT DEVICE
$WV_1 - WV_4$: WHEEL SPEED CALCULATION DEVICE
$WRC_1 - WRC_4$: TIRE DIAMETER CORRECTION COEFFICIENT CALCULATION DEVICE
REF: REFERENCE SPEED CALCULATION DEVICE
DIF: RIGHT-LEFT WHEEL SPEED DIFFERENCE CALCULATION DEVICE
RTO: REPRESENTATIVE CURVATURE CALCULATION DEVICE
$TCR_1 - TCR_4$: TURNING CORRECTION RATIO CALCULATION DEVICES
$TCA_1 - TCA_4$: TURNING CORRECTION CALCULATION DEVICES
$CWV_1 - CWV_4$: CORRECTED WHEEL SPEED CALCULATION
CTR: CONTROL LOGIC

Fig. 1

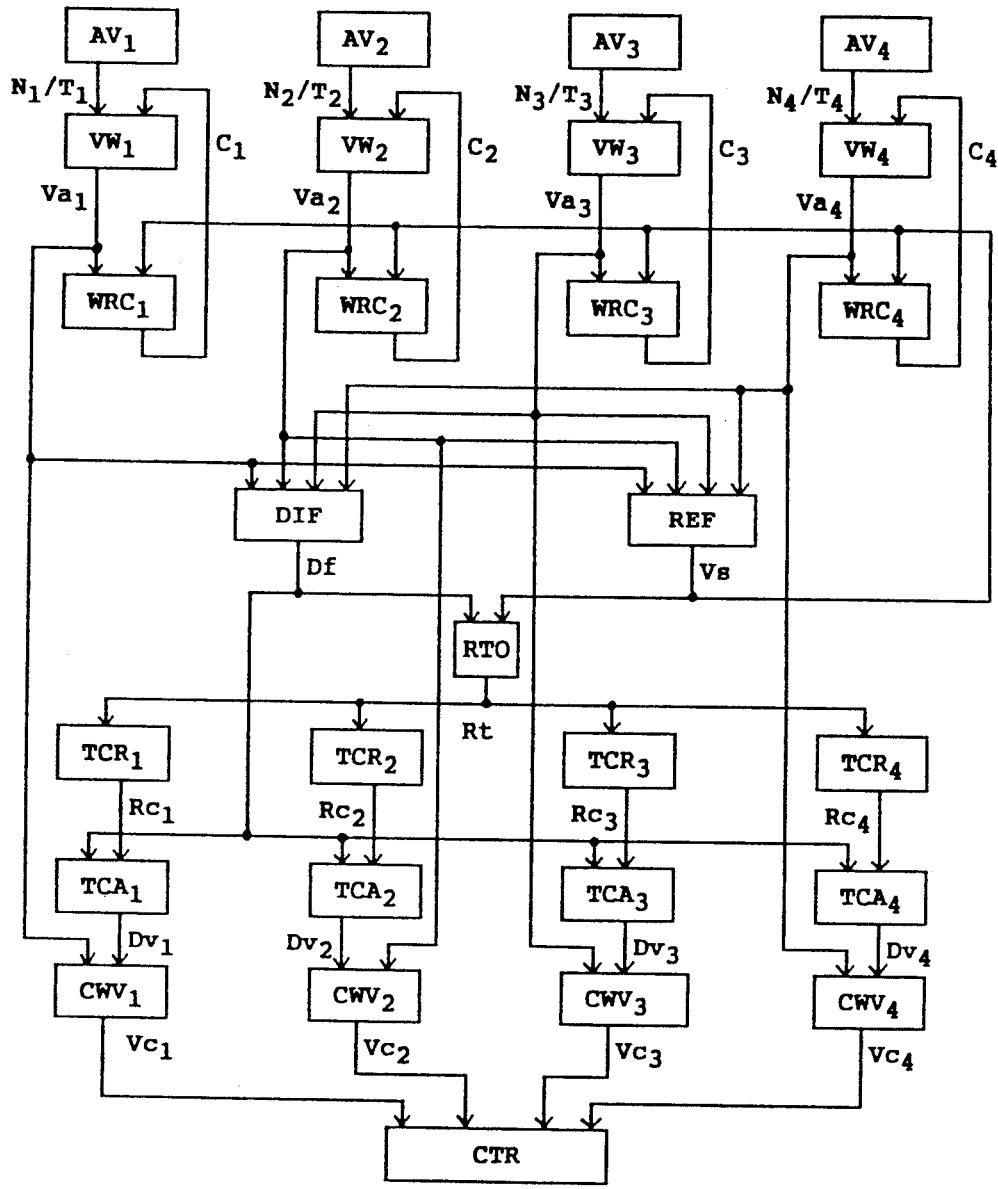

| | |
|---|---|
| $AV_1 - AV_4$: | WHEEL ANGLE SPEED MEASUREMENT DEVICE |
| $WV_1 - WV_4$: | WHEEL SPEED CALCULATION DEVICE |
| $WRC_1 - WRC_4$: | TIRE DIAMETER CORRECTION COEFFICIENT CALCULATION DEVICE |
| REF: | REFERENCE SPEED CALCULATION DEVICE |
| DIF: | RIGHT-LEFT WHEEL SPEED DIFFERENCE CALCULATION DEVICE |
| RTO: | REPRESENTATIVE CURVATURE CALCULATION DEVICE |
| $TCR_1 - TCR_4$: | TURNING CORRECTION RATIO CALCULATION DEVICES |
| $TCA_1 - TCA_4$: | TURNING CORRECTION CALCULATION DEVICES |
| $CWV_1 - CWV_4$: | CORRECTED WHEEL SPEED CALCULATION |
| CTR: | CONTROL LOGIC |

WHEEL SPEED CORRECTION DEVICE WHICH COMPENSATES FOR CHANGES IN TIRE DIAMETER AND DURING VEHICLE TURNS

BACKGROUND OF THE INVENTION

1. Field of the Invention

The present invention relates to a wheel speed correction device, and more particularly, to a wheel speed correction device which appropriately corrects each wheel speed with respect to the changes in the diameter of the corresponding tire and the changes in wheel speed which occur when the vehicle turns, and thereby accurately calculates the wheel speed of each wheel.

2. Description of the Prior Art

For a wheel behavior control, such as an antilock brake control or a traction control, it is necessary to obtain the circumferential wheel speed. However, because it is difficult to directly measure the circumferential wheel speed, the wheel rotation angular speed is generally measured and converted to the circumferential wheel speed using appropriate coefficient representing the tire diameter. The term "wheel speed" generally used herein means circumferential wheel speed. The wheel speed thus obtained is known, however, to become offset from the real vehicle speed for a variety of reasons. Causes for the difference between the wheel speed and vehicle speed, i.e., the deviation, include: (i) in the long-term, differences in the real tire diameter and the tire diameter used in the calculation; (ii) in the mid-term, differences in the paths of the left and right wheels followed when the vehicle turns; and (iii) in the short-term, abnormal slipping between the tire and road surface. Variations in the tire diameter may arise due to differences in operating conditions, such as the tire air pressure and/or amount of tire wear.

However, in conventional control systems, specifically in wheel behavior control such as the antilock brake control which should be applied only to the variations caused by factor (iii) above, control is usually applied based on the wheel speed which includes deviations caused by the tire diameter and deviations caused by turning of the vehicle. Thus, when these deviations have become so great that they cannot be ignored, special logic which accounts for abnormal tire diameter becomes necessary to handle the deviations caused by factor (i), and special logic which accounts for vehicle turning becomes necessary to handle the deviations caused by factor (ii), and the wheel behavior control logic therefore tends to become complex.

SUMMARY OF THE INVENTION

Therefore, an object of the present invention is to provide a wheel speed correction device which continuously compensates for deviations caused by tire diameter and for deviations originating from turning of the vehicle through a predetermined independent logic to simplify the control logic of the wheel behavior control device itself.

To achieve the aforementioned object, a wheel speed correction device according to the present invention comprises means for measuring a wheel rotation angular speed of each wheel; means for correcting a coefficient representing a tire diameter for each wheel; means for calculating a diameter-corrected wheel speed using the measured angular speed and the corrected coefficient; means for obtaining a turning correction amount from a difference between the diameter-corrected wheel speeds of left and right wheels; and means for correcting the diameter-corrected wheel speed using the turning correction amount and for producing a turning-corrected wheel speed as a wheel speed to be used in the control logic of the wheel behavior control device.

A wheel speed is calculated for each wheel based on a measured wheel rotation angular speed and a coefficient representing a tire diameter. Then, a reference wheel speed is calculated from all or part of the four wheel speed, and the coefficient representing the tire diameter for each wheel is corrected based on the difference between the reference wheel speed and each calculated wheel speed.

The wheel speed calculated using the corrected coefficient representing the tire diameter is actually a diameter-corrected wheel speed which is entitled to be used in the succeeding turning correction procedure and will be simply mentioned as wheel speed hereinafter.

For correcting the wheel speed variation caused by the vehicle turning, a turning correction amount for each wheel is obtained by multiplying a difference in the wheel speed of the right and left wheels by a function for each wheel, wherein the argument of the function is a ratio between the difference in the wheel speed of the right and left wheels and either the sum of the right and left wheel speed or the average thereof. Then, the wheel speed of each wheel is corrected by the turning correction amount for each wheel.

The wheel rotation angular speed is measured for each wheel and the wheel speeds based on the measurements are calculated. Then, a reference wheel speed is calculated from all or part of the four wheel speeds, and the coefficients representing the tire diameter for each wheel are corrected based on the difference between the reference wheel speed and each calculated wheel speed. A diameter-corrected wheel speed, which is a wheel speed obtained after the tire diameter is corrected based on the measured rotation angular speed, is calculated using the corrected coefficients. Then, a turning correction amount, for compensating for the wheel speed variation caused by the vehicle turning, is obtained by multiplying the difference between the wheel speed of the right and left wheels by a function, of which the argument is the ratio between the difference between the wheel speed of the right and left wheels and either the sum of the right and left wheel speeds or the average thereof. Then, the diametercorrected wheel speed for each wheel is corrected by the turning correction amount for each wheel.

BRIEF DESCRIPTION OF THE DRAWINGS

The present invention will become more fully understood from the detailed description given below and the accompanying diagrams wherein:

FIG. 1 is a block diagram of a wheel speed correction device according to the present invention.

DESCRIPTION OF PREFERRED EMBODIMENTS

Figure 2:
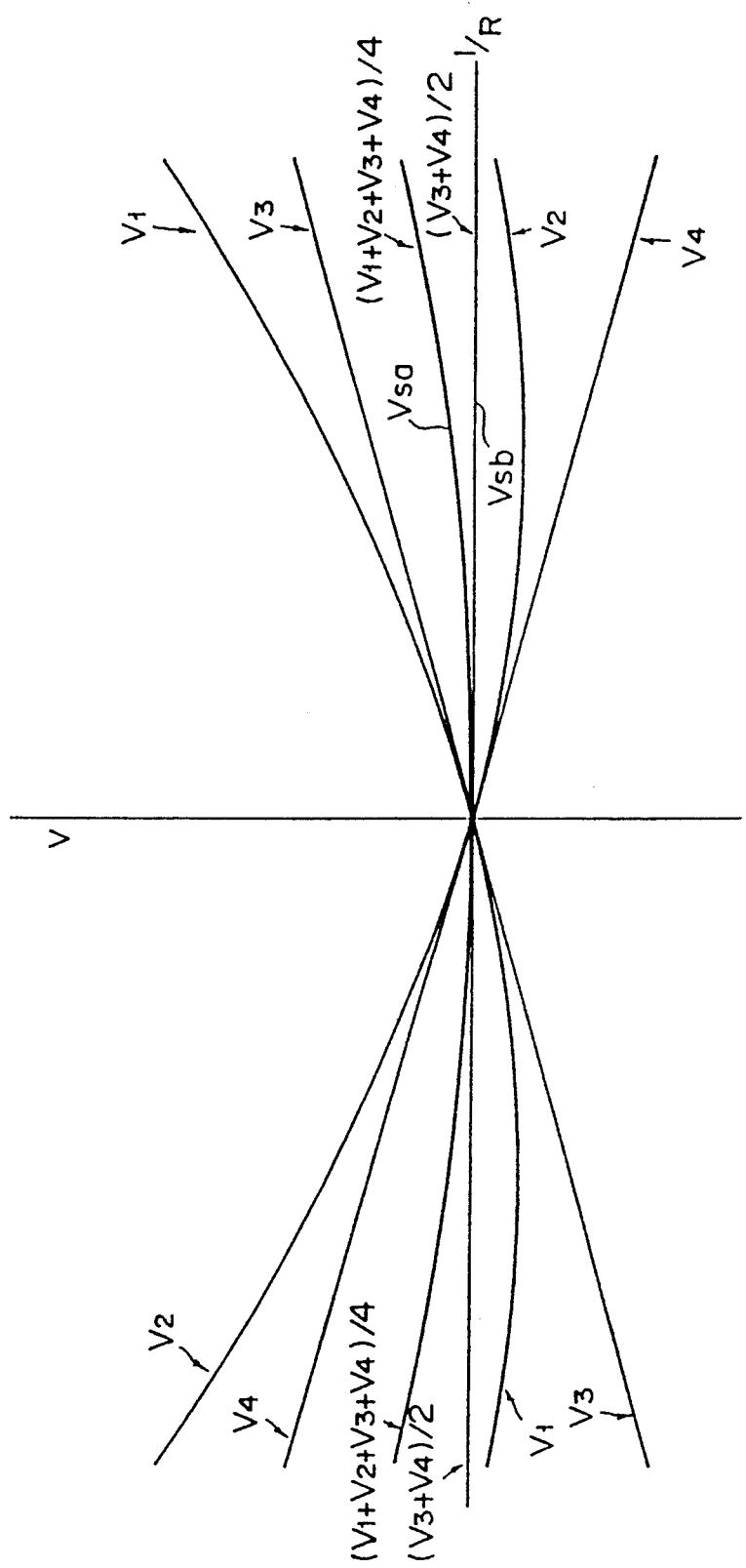
FIG. 2 is a graph showing the relationship among speed of each wheels during vehicle turning, which is the basis for turning correction ratio calculation.

A wheel speed correction device according to the present invention calculates the wheel speed of each wheel based on the angular speed of the tire. An appropriate correction is applied to each wheel to compensate for changes caused by the variation in the tire diameter of each wheel and changes caused by the turning of the vehicle, thereby continuously obtaining an accurate wheel speed for each wheel even when these changes occur. The principle for this operation is described first hereinbelow.

(1) Principle of tire diameter correction

The wheel speed $V_{ai}$ is defined by equation (1)

$$V_{ai} = 2 * \pi * r_i / Z * N_i / T_i \qquad (1)$$

in which Z is the number of teeth on the sensors provided at each wheel axle, $N_i$ is the number of teeth counted in time $T_i$, and $r_i$ is the tire radius. The suffix i indicates each one of the four wheels.

If a formula $$C_i = 2 * \pi * r_i / Z \qquad (2)$$

is used in equation (1) in which $C_i$ represents a circumferential distance of the tire when the wheel axis is rotated by one teeth-repetition interval, then equation (1) can be simplified as:

$$V_{ai} = C_i * N_i / T_i \qquad (1')$$

In equation (1'), the value $N_i/T_i$ represents the angular speed in this measurement method, and $C_i$ is a coefficient that represents the tire diameter $r_i$.

The coefficient $C_i$ is obtained as follows.

The wheel speed $V_{ai}$ and a reference speed $V_s$ are compared for each wheel. If there is a tendency for $V_{ai}$ to be greater than $V_s$, the value $C_i$ is slightly reduced from the value $C_i$ used in the previous cycle, but if there is a tendency for $V_{ai}$ to be less than $V_s$ the value of $C_i$ is slightly increased from the value $C_i$ used in the previous cycle, so as to make the wheel speed $V_{ai}$ equal to the reference speed $V_s$ in the long term. The reference speed $V_s$ is defined here to be the average of the wheel speeds $V_{ai}$ of those wheels selected as the reference wheels.

One example of this method is to provide a sufficiently large number of meaningful digits for $C_i$, and to calculate $C_i$ at each operation cycle using an appropriate coefficient a defining the correction speed as shown in equation (3).

$$C_i = C_i - a * (V_{ai} - V_s) \qquad (3)$$

An alternative method which does not use an extremely large number of meaningful digits to express $C_i$ and which effectively reduces the value of a is to calculate $C_i$ once every operation cycles rather than once per each operation cycle, thereby reducing the actual effectiveness of coefficient a to be 1/n of the original effectiveness.

In addition, it is possible to change the effective value of a according to the conditions. When the accuracy of the measured wheel speed is doubtful. Such conditions occur, e.g., when the absolute value of the estimated vehicle acceleration is greater than a predetermined constant value, or when the vehicle is assumed to be turning, or when the vehicle is travelling on poor rugged roads, or when excessive slipping is assumed to be occurring between the tires and the road surface, or when the reference speed $V_s$ is relatively high. When one or more of these conditions is met, the effective value of a can be made relatively low according to the conditions. In extreme cases, the value of a may be made 0, which means that the correction is inhibited under certain specific conditions.

For the changes in the tire diameter can occur only over the long term, however, there is virtually no need to provide for these exceptional conditions if the effective value of a is set low enough so that the speed of correction is sufficiently slow. In other words, under conditions opposite to those defined above, there is essentially no need to increase the speed of correction for the long term change. In fact, it is preferable to set a an effectively high value for a certain period after the computer is reset (preferably until the vehicle travels a predetermined distance after the computer is reset).

Furthermore, the correction amount by which $C_i$ is corrected can be expressed as a suitable function, e.g., a logarithm of the absolute value of $(V_{ai} - V_s)$ with a suitable sign, + or −, (providing a means to define the correction amount as 0 when the logarithm is negative), rather than as simply proportional to $(V_{ai} - V_s)$.

In an extreme case, a constant value could be simply added to or subtracted from $C_i$ according to the sign with no relationship to the absolute value of $(V_{ai} - V_s)$.

Furthermore, in equation (3) the number of digits needed to express the difference $(V_i - V_s)$ as a binary number can be used as the correction amount for correcting $C_i$.

In addition, when the tire diameter correction is executed once every n operation cycles, tire diameter correction can be applied to all tires at each n cycles by utilizing a counter device, or one of the tires may be sequentially corrected every n/4 cycles. It is to be noted that the correction speed (effective speed) may be constant, but it may also be accelerated immediately after resetting the computer and gradually slowed thereafter to the predetermined rate.

To prevent the average of $C_i$ for each wheel from deviating significantly from the initial value of C, i.e., to maintain the average of $C_i$ within a predetermined deviation from the initial value of C, a suitable adjusting means may be provided so that the values of $C_i$ for all of the other wheels are adjusted in the opposite direction, instead of adjusting the value of $C_i$ for one wheel in one direction when the average of $C_i$ is deviated too much from its initial value. Alternatively, correction could be applied only to one wheel for which the absolute value of the correction amount is greatest which the correction of the other wheels is suppressed.

Further, when the measurement method for the angular speed differs, a different coefficient C representing r should be used to convert the measured angular speed to the wheel speed, according to the measurement method employed.

As described hereinabove, since a specific $C_i$ is set individually for each of the four wheels, and is corrected individually, the wheel speed for each wheel can be corrected with a high accuracy.

(2) Principle of vehicle turning correction

After correcting the tire diameter as described in section (1) above, turning correction is applied based on the wheel speed of each tire diameter-corrected wheel. The following description applies specifically to a four wheel vehicle, but similar equations can also be established for e.g. a six wheel vehicle from the geometric relationship between the wheels.

In the case of a four wheel vehicle, the relationship, assuming there is no slipping between the tires and the road surface, between the speed Vci of each wheel is defined by the following equations:

$$Vc_1 = Vo * sqrt((1+G/(2*R))2+(W/R)2)$$

$$Vc_2 = Vo * sqrt((1-G/(2*R))2+(W/R)2)$$

$$Vc_3 = Vo * (1+G/(2*R))$$

$$Vc_4 = Vo * (1-G/(2*R)).$$

Wherein $Vc_1$ is wheel speed of outside front wheel, $Vc_2$ is of inside front wheel, $Vc_3$ is of outside rear wheel, $Vc_4$ is of inside rear wheel, Vo is the vehicle speed represented by the speed at the medium point of both rear wheels, G is tread, W is wheel base, R is the turning radius at the medium point of both rear wheels. When one wheel Wi is taken into consideration, a deviation speed Dvi=Vci−Vs which is greater (or less) than the reference speed Vs is observed.

Thus, if the turning correction amount Dvi is obtained by some means, it is possible to obtain a turning correction applied wheel speed, which is the wheel speed obtained after the turning correction. The turning correction applied wheel speed for each of the four wheels can be obtained by subtracting Dvi from the tire diameter correction applied wheel speed, and would all be equal to the reference wheel speed Vs, provided that there is no slipping between the tire and road surface.

Thus, in the following stages where the wheel behavior control calculations are effected based on the maximum speed, minimum speed, estimated vehicle speed, and the deviation between the estimate vehicle speed and each wheel speed, it is preferable to use the wheel speeds corrected by Dvi. If such wheel speeds are used, the difference between each wheel speed and the estimated vehicle speed would become a value in which the turning correction is already considered.

Thus, a further wheel behavior control calculations can be carried out simply using the wheel speed because the effect of turning is already corrected.

Here, the problem is how to obtain the correction amount Dvi for turning correction.

Because the speed Vci of each wheel is the product of a function of R and Vo, if desired linear combinations, where Vci is not 0, are defined as La, Lb, or Lc, these linear combinations can all be expressed as the product of Vo and proper function of R. Therefore, when the linear combination ratio La/Lb is taken, Vo is canceled and a function containing only the parameter R is obtained.

From the above fact, it is understood that there exist a function f which satisfies that Dvi =Lc * f(La/Lb) for any La, Lb, and Lc. Since La/Lb is a value representing a curvature, it is natural to define La as the difference between the right and left wheel speeds, and Lb as the sum of the right and left wheel speeds. However, since the average speed is already obtained as the reference speed Vs during tire diameter correction, it is more efficient to use this value as Lb. When Lb, i.e., Vs, is obtained based on all four wheels, La, i.e., the right-left wheel speed difference, should also be obtained based on all four wheels. However, when Lb is obtained based on the non-drive wheels, La should also be obtained based on the non-drive wheels. In addition, it is preferable from the viewpoint of calculation precision that Lc should be approximately equal to the average of Dvi. Therefore, it is most efficient to adopt the right-left wheel speed difference La which is already calculated. In the following description, it is assumed that Lc=La.

The form of the function f for each wheel can be determined by the absolute value of the ratio La/Lb, provided that the sign, + or −, of La indicates whether the wheel is at the inside or outside of the turning curve. It is to be noted that since Lb is always positive, the sign of La determines the sign of the ratio La/Lb. For example, when $$Dv_1 = La * f_1(La/Lb)$$

$$Dv_2 = La * f_2(La/Lb)$$

are satisfied under the condition that L>0, it is understood that
$$Dv_1 = -La * f_2(-La/Lb)$$

$$Dv_2 = -La * f_1(-La/Lb)$$

are satisfied under the condition that La<0. In other words, if, when La>0

$$Dv_1 = |La| * (|La|/Lb)$$

is satisfied then when La<0

$$Dv_1 = |La| * f_2(|La|/Lb)$$

is satisfied. These equations imply that the form of the function f to be applied to the inside or outside wheel changes according to the sign of La.

Even if the form of the function f is complex, it will cause no problems for practical performance if the function is pre-calculated to generate a reference table stored in a memory. However, instead of the complex function, it is possible to use a simple form of the function where an approximation is accepted. As will be shown in the description of the preferred embodiment hereinbelow, if La is the right-left wheel speed difference and Lb is the reference speed, the function f can be given by a linear combination of La/Lb, which has an extremely high approximation precision.

Since the variations caused by the vehicle turning are mid-term variations, it is necessary to apply a suitable delay processing means. Otherwise, the short-term variations, as in the abnormal slipping between the road surface and tires, would falsely correct the wheel speed through the above calculations.

The delay processing means can be applied by the use of an appropriate time constant filter to one or more calculation stages, such as a stage for calculating the right-left wheel speed difference La, a stage for calculating the standard speed Lb, a stage for calculating the value La/Lb representing the curvature, or a stage for calculating the correction amount Dvi. Practically, it is most efficient to apply the filter to the stage for calculating La and Lb, because doing so will in effect automatically apply the filter to the stages for calculating La/Lb and Dvi. Furthermore, in the most cases, it is sufficient for practical applications to simply apply the filter to the stage for calculating La.

While the accuracy of estimation of the reference speed and the right-left wheel speed difference between the comparison wheels (the reference comparison wheels) increases in general when the information from all wheels is taken into account, the results may become more accurate if the information from the drive wheels is excluded when excessive spinning occurs in the drive wheels during acceleration. On the other hand, it is not possible to exclude excessive slipping during deceleration because this will probably occur at any wheel.

Therefore, for the vehicles that has non-drive wheels, the reference speed and right-left wheel speed difference can be based on only the non-drive wheels when an excessive spinning is observed and on all wheels when no excessive spinning is observed. It is, of course, possible to base these calculations on all wheels at all times.

Should a malfunction occur in the wheel angular speed measurement device for one wheel and the measured angular speed for that wheel is 0, it is necessary to exclude this false wheel speed measurement from the correction operation if calculations are to be continued. In this case, the calculation will be relatively simple if one pair of the right and left wheels, either front or rear which does not include the defective wheel, is used as the basis for the reference speed and right-left wheel speed difference calculations.

Embodiment

Referring to FIG. 1, a block diagram of a wheel speed correction device according to the present invention is shown. The numbers 1, 2, 3 and 4 suffixed to the reference characters correspond to front left wheel, front right wheel, rear left wheel and rear right wheel, respectively.

Reference characters $AV_1$-$AV_4$ designate wheel angular speed measurement devices, each is formed, for example, by a plurality of teeth spaced at equal intervals around the rotational axis of the wheel, and a means for detecting the passage of each tooth.

Reference characters $WV_1$-$WV_4$ designate wheel speed calculation devices, each of which calculates the wheel speed Vai (i=1, 2, 3, 4) based on the angular speed detected and the output by the wheel angular speed measurement devices $AV_1$-$AV_4$.

Reference characters $WRC_1$-$WRC_4$ designate tire diameter correction coefficient calculation devices, each of which receives the wheel speed Vai and the reference speed Vs, which is described hereinafter, to calculate the coefficient Ci representing the tire diameter used in the wheel speed calculation.

Reference character REF designates a reference speed calculation device, which calculates the average of the selected reference wheel speeds Vai and outputs the obtained average as the reference speed Vs. The non-drive wheels are selected as the reference wheels when the speed of the drive wheels is judged unreliable, and all four wheels are selected as the reference wheels when the drive wheels have no excessive spinning. The judgement of the reliability is carried out in a control logic CTR, which will be described later.

Reference character DIF designates a right-left wheel speed difference calculation device which calculates a speed difference between right and left wheels of the selected reference wheels. The obtained difference is fed to an exponential filter (not shown) having an appropriate attenuation rate to obtain a difference Df.

When the speed of two or four wheels are used in calculating Vs, the speed of the same wheels should be used in calculating Df.

Reference character RTO designates a representative curvature calculation device which calculates a ratio of difference Df to the reference speed Vs, and outputs the result as the representative curvature Rt of the curvature of the path through which the vehicle is turning.

Reference characters $TCR_1$-$TCR_4$ designate turning correction ratio calculation devices which calculates a correction ratio Rci for each wheel by using a predetermined function fi(Rt) in which the representative curvature Rt obtained from the representative curvature calculation device RTO is inserted as a parameter.

Reference characters $TCA_1$-$TCA_4$ designate turning correction calculation devices which calculates a correction amount Dvi by multiplying the difference Df by the correction ratio Rci of each wheel.

Reference characters $CWV_1$-$CWV_4$ designate turning-corrected wheel speed calculation devices which calculate a corrected wheel speed Vci by adding (or subtracting) the correction amount Dvi to (or from) the wheel speed Vai obtained from the wheel speed calculation devices $WV_1$-$WV_4$.

Reference character CTR designates a control logic which carries out the antilock brake control or other wheel behavior control operation by the use of the corrected wheel speed Vci.

The operation of the wheel speed correction device shown in FIG. 1 is described below.

The wheel angular speed measurement device AVi outputs the ratio Ni/Ti of the counted number of teeth Ni to the time required for counting Ti as the representative value of the speed of rotation, and the wheel speed Vai is produced from the wheel speed calculation device WVi based on equation (1'). The coefficient Ci calculated by the tire diameter correction coefficient calculation device WRCi is used in this operation.

The tire diameter correction coefficient calculation device WRCi compares Vai and Vs for each wheel. If there is a tendency for Vai to be greater than Vs the value of Ci is slightly reduced from the value Ci used in the previous cycle, but if there is a tendency for Vai to be less than Vs the value of Ci is slightly increased from the value Ci used in the previous cycle. In this embodiment, Ci is calculated every n unit operation cycles using the equation $$Ci = Ci - a * (Vai - Vs) \quad (3).$$

The reference speed Vs is next calculated by the reference speed calculation device REF. The graph in FIG. 2 shows the wheel speed Vi for each wheel wherein the abscissa represent the inverse of the turning radius R and the ordinate represent the wheel speed. The reference speed Vsa is obtained when all four wheels are selected as the reference wheels, and the reference speed Vsb is obtained when only the two rear wheels are selected as the reference wheels. Thus, the reference speeds Vsa and Vsb are defined by the following equations.

$$Vsa = (V_1 + V_2 + V_3 + V_4)/4$$

$$Vsb = (V_3 + V_4)/2$$

It is to be noted that Vsb is applied to a front wheel drive vehicle. In the case of the rear wheel drive vehicle, the reference speed Vsc can be expressed as $$Vsc = (V_1 + V_2)/2.$$

The line be plotted between $V_1$ and $V_2$ in FIG. 2.

In the right-left wheel speed difference calculation device DIF, the right-left wheel speed difference $(V_1 - V_2)$ or $(V_3 - V_4)$ is obtained when only two wheels are considered, or the right-left wheel speed difference $\{(V_1 - V_2 + V_3 - V_4)/2\}6$ is obtained when four wheels are considered. The obtained difference is filtered as required. The filtering can be calculated, for example, as $$Df = Df + ((V_1 - V_2 + V_3 V_4)/2 - Df) * b \quad (4)$$

where b is an exponential filter exponent and is such that $0 \leq b \leq 1$. If filtering is not applied, then $b = 1$.

It is to be noted that when all four wheels are always selected as the reference wheels, $(V_1 - V_2 + V_3 - V_4)$ can be filtered directly. However, when it is necessary to change the reference wheels between the processing the excessive acceleration state and normal state, it would be more convenient for the subsequent processing to average the filtered value of front wheel speed difference and the filtered value of rear wheel speed difference.

The representative curvature Rt is calculated in the representative curvature calculation device RTO by the following equation:

$$Rt = Df/Vs \quad (5).$$

The calculated representative curvature Rt is applied to the turning correction ratio calculation device TCRi in which the correction ratio Rci for each wheel is calculated by the use of a predefined function fi(Rt) in which the obtained Rt is inserted.

Figure 3:
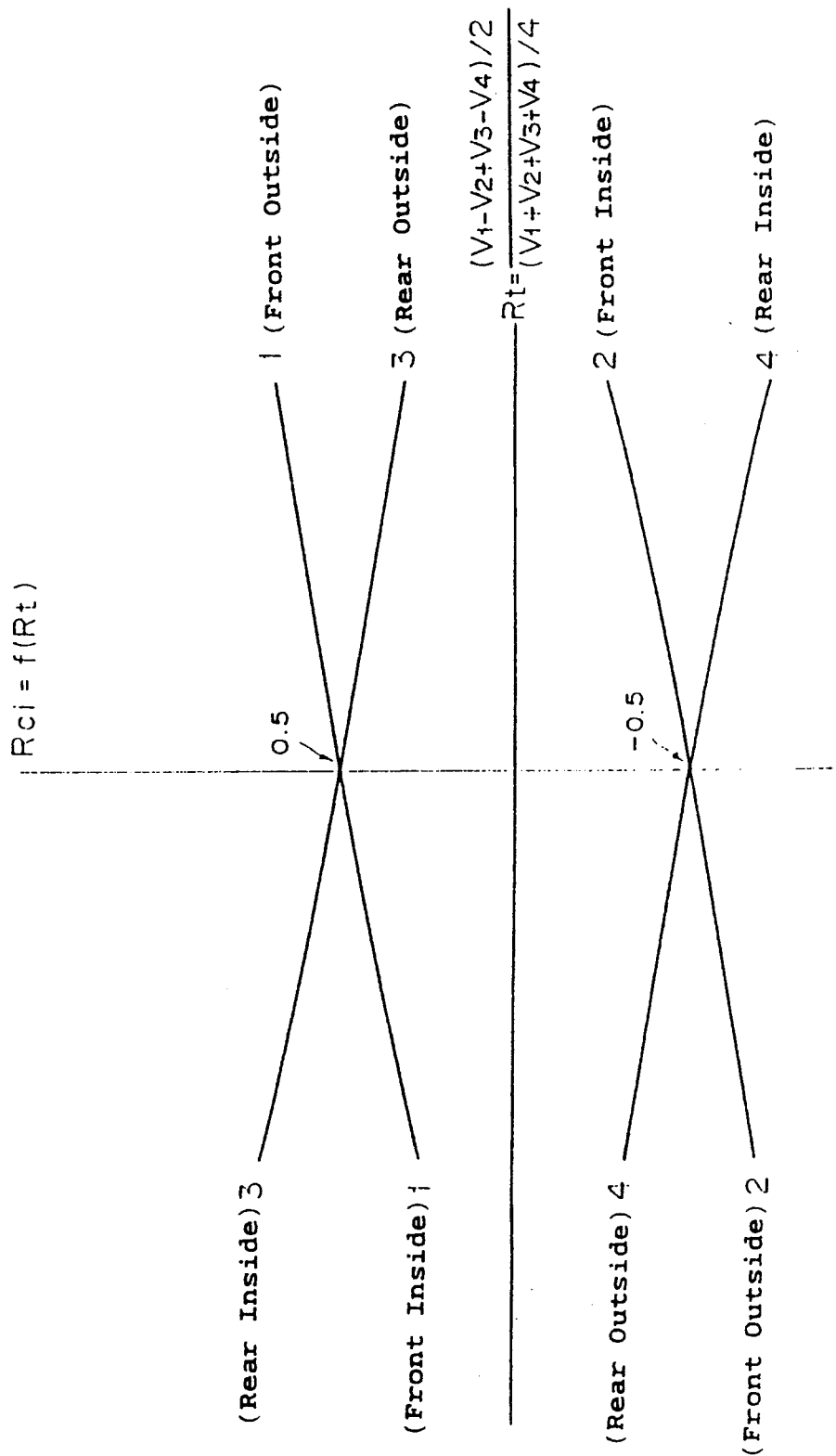
FIG. 3 is a graph in which the abscissa represent a value of the turning curvature, and ordinate represent a turning correction ratio.

Referring to FIG. 3, a graph of one example of function fi(Rt) is shown for a case in which all four wheels are selected as the reference wheels. From the graph in FIG. 3 it is understood that a simple linear equation can be used for the function fi(Rt) with good precision in both the positive and negative ranges of the horizontal axis. The absolute value of the tangent of the linear equation for the outside wheels and that for the inside wheels differ slightly.

However, unless very high precision is particularly required, the same absolute value of the tangent can be applied in both cases.

In this case, the following equations can be applied as the most simplified forms of the approximate equations for the predefined function fi(Rt).

$$Rc_1 = f_1(Rt) \approx e * Rt + h \quad (6)$$

$$Rc_2 = f_2(Rt) \approx e * Rt - h \quad (7)$$

$$Rc_3 = f_3(Rt) \approx -e * Rt + h \quad (8)$$

$$Rc_4 = f_4(Rt) \approx -e * Rt - h \quad (9)$$

In order to increase precision, the absolute values of e could be changed for the outside and inside wheels. For this purpose, the following method is preferable.

Figure 4:
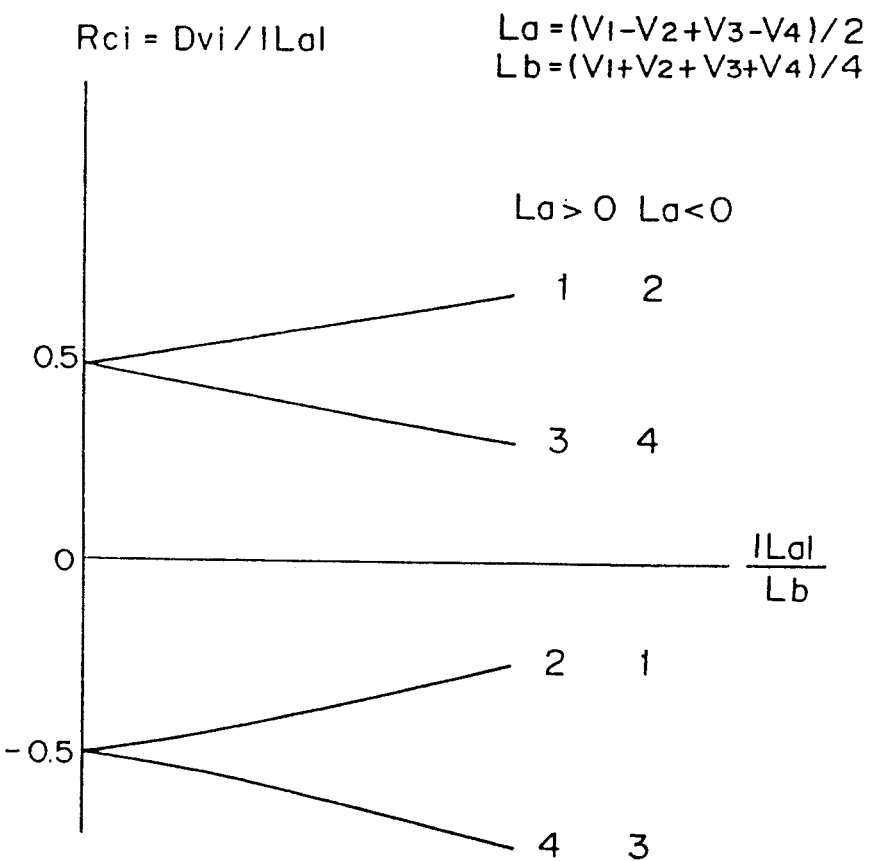
FIG. 4 is a graph similar to FIG. 3, but particularly showing a case when the abscissa represent the absolute values.
Figure 5:
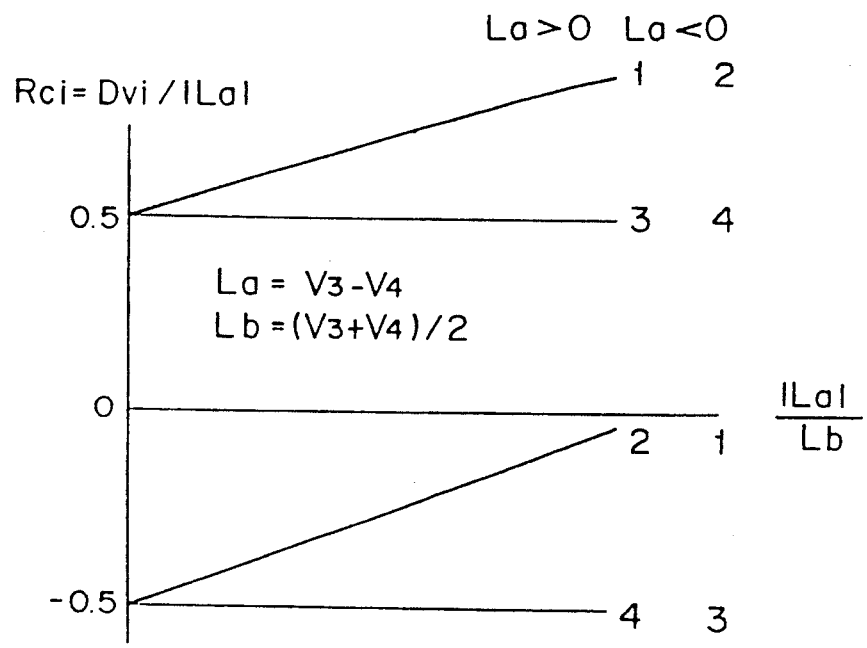
FIG. 5 is a graph similar to FIG. 4, but particularly showing a case when the rear two wheels are used as the reference wheels.
Figure 6:
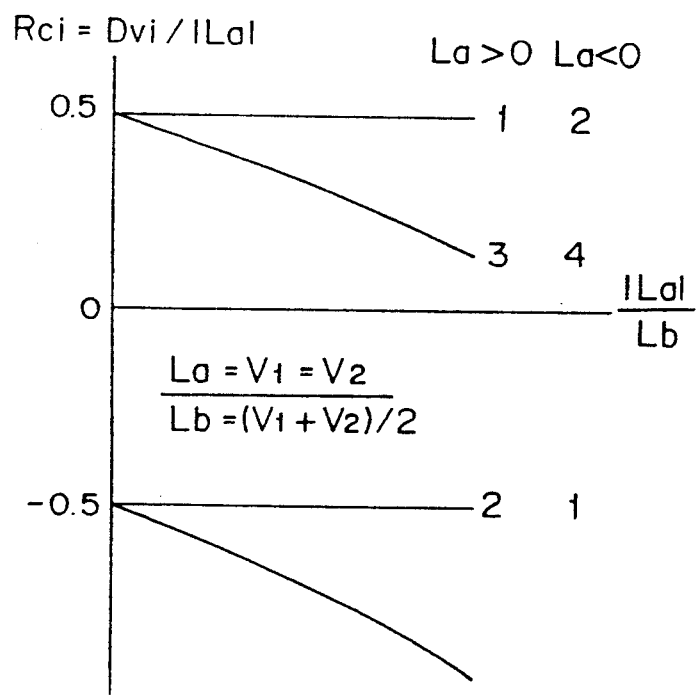
FIG. 6 is a graph similar to FIG. 4, but particularly showing a case when the front two wheels are used as the reference wheels.

In the turning correction ratio calculation device TCRi, function fi(Rt) is defined separately for each of the outside front, inside front, outside rear, and inside rear wheels with respect to the absolute value of the representative value of the curvature. Then, based on the sign of the representative value of the curvature, a proper function fi(Rt) is selected judging which wheel is outside and which is inside. In this case, an absolute value of the right-left wheel speed difference is used in the turning correction amount calculation device TCAi. FIG. 4 shows a variation of FIG. 3 obtained by the above method. Similarly, FIGS. 5 and 6 show other variations in which front two wheels and the rear two wheels, respectively, are selected as the reference wheels.

It should be noted that, to obtain the correction ratio Rci, a table having representative curvature Rt and corresponding correction ratio Rci values can be used instead of using a numerical equation. Such a table should be stored in a suitable memory.

Then, in the turning correction amount calculation device TCAi, the correction ratio Rci and the difference Df are used to calculate the correction amount Dvi based on the equation:

$$Dvi = Rci * Df \quad (10).$$

The obtained correction amount Dvi is applied to the corrected wheel speed calculation device CWVi.

The corrected wheel speed calculation device CWVi then calculates the corrected wheel speed Vci by the following equation:

$$Vci = Vai - Dvi \quad (11).$$

The corrected wheel speed Vci is then used in the control logic CTR in which the wheel behavior control, such as antilock brake control, is carried out.

As described hereinabove, a wheel speed correction device according to the present invention carries out the correction of each wheel speed variations, resulting from changes in the tire diameter and vehicle turning, based on a separate logic operation preceding the wheel behavior control logic. It is therefore not necessary for these correction steps to be provided in the wheel behavior control logic, thus simplifying the wheel behavior control logic and facilitating the tuning of such wheel behavior control logic.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A wheel speed correction device for use in a vehicle having a plurality of wheels and a wheel behavior control device, comprising:
   means for measuring a wheel rotation angular speed of each wheel;
   means for correcting a coefficient representing a tire diameter for each wheel;
   means for calculating diameter-corrected wheel speeds for left and right wheels of the vehicle using the measured angular speed and the corrected coefficient;
   means for obtaining a turning correction amount from a difference between the diameter-corrected wheel speeds of the left and right wheels; and means for correcting the diameter-corrected wheel speed using the turning correction amount and for producing a turning-corrected wheel speed for each wheel, so that the turning-corrected wheel speed is provided as a wheel speed to be used in a control logic of the wheel behavior control device.

2. A wheel speed correction device according to claim 1, wherein said means for correcting the tire-diameter coefficient comprises:

means for selecting at least two reference wheels;

means for calculating an average of the diameter-corrected wheel speeds of the selected reference wheels; and means for calculating a correction amount for correcting the tire-diameter coefficient for each wheel based on the difference between the average of the reference wheel speeds and each diameter-corrected wheel speed;

3. A wheel speed correction device according to claim 2, wherein said means for correcting the coefficients comprises counter means for executing the correction of the tire diameter coefficient cyclically after a predetermined number of operation cycles.

4. A wheel speed correction device according to claim 2, further comprising means for obtaining the absolute value of the correction amount, so that said diameter-corrected wheel speed calculating means calculates the diameter-corrected wheel speed of each wheel based on the absolute value of the correction amount.

5. A wheel speed correction device according to claim 2, wherein said means for obtaining the turning correction amount comprises means for calculating the turning correction amount based on the product of a third linear combination of wheel speed and a predetermined function of a ratio between a first linear combination of wheel speed and a second linear combination of wheel speed.

6. A wheel speed correction device according to claim 5, wherein said turning correction amount obtaining means further comprises:

means for selecting at least two reference wheels;

means for obtaining said second linear combination as an average speed of said reference wheels;

means for obtaining said first and third linear combination as a right-left wheel speed difference of said reference wheels;

means for obtaining said ratio between said first and second liner combinations;

means for obtaining a value of said function using said ratio as the argument of said function; and means for obtaining said turning correction amount as the product of said third linear combination and said value of said function.

7. A wheel speed correction device according to claim 6, wherein said first linear combination obtaining means comprises means for filtering a variable used in said first linear combination obtaining means.

8. A wheel speed correction device according to claim 5, wherein said selected reference wheels are all of the wheels.

9. A wheel speed correction device according to claim 5, wherein said selected reference wheels are non-drive wheels.

10. A wheel speed correction device according to claim 5, further comprising means for determining whether a wheel is spinning excessively, wherein said selected reference wheels are non-drive wheels when the drive wheels are determined to be spinning excessively, and all wheels when the drive wheels are determined to not be spinning excessively.

11. A wheel speed correction device according to claim 2, wherein said selected reference wheels are all of the wheels.

12. A wheel speed correction device according to claim 2, wherein said selected reference wheels are non-drive wheels.

13. A wheel speed correction device according to claim 2, further comprising means for determining whether a wheel is spinning excessively, wherein said selected reference wheels are non-drive wheels when the drive wheels are determined to be spinning excessively, and all wheels when the drive wheels are determined to not be spinning excessively.

14. The wheel speed correction device according to claim 1, said wheel behavior control device comprising a traction control device.

15. The wheel speed correction device according to claim 1, said wheel behavior control device comprising an antilock brake control device.

* * * * *

UNITED STATES PATENT AND TRADEMARK OFFICE
CERTIFICATE OF CORRECTION

PATENT NO. : 5,292,184
DATED : March 8, 1994
INVENTOR(S) : K. TAKATA

It is certified that error appears in the above-indentified patent and that said Letters Patent is hereby corrected as shown below:

At column 4, line 37, change "Vi-Vs" to ---Vai-Vs---.
At column 4, line 41, insert ---by utilizing a counter device--- after "cycles".
At column 4, lines 42 and 43, delete "by utilizing a counter device" after "cycles".
At column 5, line 67, change "speeds. and" to ---speeds, and---.
At column 6, line 26, change "L>0" to ---La>0---.
At column 6, line 34, after "*" insert ---fl---.
At column 9, line 7, change "line be" to ---line Vsc would be---.
At column 9, line 12, change "/256" to ---/2}---.

Signed and Sealed this

Twenty-second Day of October, 1996

Attest:

BRUCE LEHMAN

Attesting Officer    Commissioner of Patents and Trademarks